Patented Oct. 14, 1930

1,778,165

UNITED STATES PATENT OFFICE

RUPERT WILLIAM POPE, OF HUDDERSFIELD, AND MAX WYLER, OF BLACKLEY, MANCHESTER, ENGLAND, ASSIGNORS TO IMPERIAL CHEMICAL INDUSTRIES LIMITED, OF LONDON, ENGLAND

SULPHIDE DYESTUFFS FROM AZINES AND PROCESS OF MAKING

No Drawing. Application filed July 19, 1928, Serial No. 294,051, and in Great Britain September 8, 1927.

This invention relates to new intermediate compounds and to new red-brown sulphide vat dyes obtainable therefrom by the usual processes of thionation.

It is well known that certain hydroxylated derivatives of phenazine, e. g., aminohydroxyphenazine:

$$NH_2-\text{[phenazine]}-OH$$

yield, when thionated by means of sodium polysulphide in the presence of copper compounds, sulphide vat dyes giving reddish brown shades on cotton.

We have now found by treating certain nuclear hydroxylated dyes of the azine group, namely the class of compounds consisting of phenazines, naphthophenazines or dinaphthazines, with alkali metal hydroxide and carbon dioxide under pressure, either separately or combined as alkali metal bicarbonate, we obtained dyestuff intermediates which are probably modified carboxylated bodies and which, when thionated with an alkali metal polysulphide in the presence of copper or its compounds, are converted into sulphide vat dyes of enhanced redness and brightness.

For the practice of our invention we may use as starting material any hydroxylated phenazine, naphthophenazine or dinaphthazine in which there is a free position ortho to at least one hydroxyl group. The treatment may be carried out in aqueous media, e. g. when using an alkali metal bicarbonate or carbon dioxide gas, or in the absence of water, e. g. when using carbon dioxide gas. The alkali metal salt of the hydroxy compound may be employed.

This treatment is the first step in our process and forms the dyestuff intermediate which is subsequently thionated. The exact course of reaction is not known. It is probable that a carboxylation takes place in a manner analogous to that in "Kolbe's synthesis" (salicylic acid from sodium phenolate) and this carboxylation may or may not be accompanied by anhydride formation or by some type of condensation. It is difficult to establish chemically the exact constitution of the intermediate so produced. However we have found that the intermediate so produced is different from azines of the same type containing a carboxylic group and made in other ways; and that the sulphide vat dyes produced by subsequently thionating this intermediate product are different from those heretofore known and have advantageous properties. We shall for convenience term these new dyestuff intermediates, "modified carboxylated, hydroxylated azines."

The starting material may contain other substituents besides the essential hydroxyl group, and we obtain especially good results with azines containing both amino and hydroxyl groups.

The modified carboxylated hydroxylated azines are red or reddish-brown in colour, almost insoluble in water, dilute mineral acids and sodium carbonate solution but readily dissolving in an aqueous solution of caustic soda to a brown solution.

The sulphide dyes are green substances nearly insoluble in water but dissolving readily in dilute sodium sulphide solution, dyeing cotton in brown shades.

Our invention is illustrated, but not limited, by the following examples, in which the parts are by weight:

*Example I.*—50 parts of the sodium salt of the azine represented by the following formula

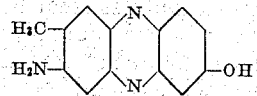

are dissolved in 50 parts water and 160 parts sodium bicarbonate are added. The mixture is heated in a suitable vessel under its own pressure to a temperature of 135° C. for 10 hours. After cooling, soluble sodium salts are removed by washing and filtration and the sodium salt of the new modified carboxylated azine remains behind. This can be readily converted into the acidic form by treatment with an acid, as, for instance, dilute hydrochloric acid. The acidic form is a bright reddish powder which is insoluble in water, but dissolves readily in caustic alkalies to form a brown solution.

By thionation with sodium polysulphide in the presence of copper sulphate a reddish-brown sulphide vat dye is obtained. The dyestuff is a dark green substance with bright fracture nearly insoluble in water but dissolving readily in dilute sodium sulphide solution. Cotton dyed in such a solution gives brown shades which, on standing in the wet state in air, develop a bright red-brown shade of good fastness to light.

*Example II.*—50 parts of the finely-divided sodium salt of the azine represented by the following formula

are introduced into a suitable vessel provided with a steam jacket and an agitator.

The vessel is heated by admission of steam into the jacket and a vacuum is applied by suitable means, whereby the whole of the moisture present in the sodium salt is removed. At this point carbon dioxide gas is blown into the vessel until the pressure reaches about 100 lb. and at the same time the steam pressure in the jacket is adjusted to about 60 lb. These conditions are maintained for 12 hours when the vessel is allowed to cool. The dry powdery product resulting can be used directly for making sulphur colours or can be converted into the acidic form as described in Example I.

What we claim and desire to secure by Letters Patent is:—

1. In the manufacture of sulphide dyes, the process which comprises treating under pressure the class of azine compounds consisting of phenazines, naphthophenazines and dinaphthazines with alkali metal hydroxide and carbon dioxide to produce modified carboxylated hydroxylated azines and then thionating the so produced modified azines by means of an alkali metal polysulphide in the presence of a copper compound.

2. In the manufacture of sulphide dyes, the process which comprises treating under pressure the class of azine compounds consisting of phenazines, naphthophenazines and dinaphthazines with alkali metal hydroxide and carbon dioxide to produce modified carboxylated hydroxylated azines and then thionating the so produced modified azines by means of sodium polysulphide in the presence of a copper compound.

3. In the manufacture of sulphide dyes, the process which comprises treating under pressure a nuclear hydroxylated phenazine with alkali metal hydroxide and carbon dioxide and thionating the resulting product with an alkali metal polysulphide in the presence of a copper compound.

4. In the manufacture of sulphide dyes, the process which comprises treating under pressure a nuclear hydroxylated phenazine with alkali metal hydroxide and carbon dioxide combined as an alkali metal bicarbonate and thionating the resulting product with an alkali metal polysulphide in the presence of a copper compound.

5. In the manufacture of sulphide dyes, the process which comprises treatment under pressure of a nuclear hydroxylated phenazine with alkali metal hydroxide and carbon dioxide and thionating the resulting product with sodium polysulphide in the presence of a copper compound.

6. In the manufacture of sulphide dyes, the process which comprises treatment under pressure of a nuclear hydroxylated phenazine with alkali and carbon dioxide combined as an alkali metal bicarbonate and thionating the resulting product with sodium polysulphide in the presence of a copper compound.

7. In the manufacture of sulphide dyes, the process which comprises treatment under pressure of a nuclear hydroxylated phenazine with alkali metal hydroxide and carbon dioxide combined as an alkali metal bicarbonate and thionating the resulting product with sodium sulphide and sulphur in the presence of a copper compound.

8. In the manufacture of sulphide dyes, the process which comprises treatment under pressure of a nuclear hydroxylated phenazine with alkali metal hydroxide and carbon dioxide and thionating the resulting product with sodium sulphide and sulphur in the presence of a copper oxide.

9. In the manufacture of sulphide dyes, the process which comprises treating under pressure an azine compound having the following structure

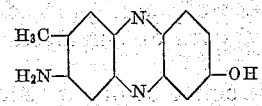

with alkali metal hydroxide and carbon dioxide and then thionating the resulting product with an alkali metal polysulphide in the presence of copper sulphate.

10. As new products, the sulphide dyestuffs obtainable by treating under pressure the class of azine compounds consisting of phenazines, naphthophenazines and dinaphthazines with alkali metal hydroxide and carbon dioxide to produce modified carboxylated hydroxylated azines and then thionating the so produced modified azines by means of an alkali metal polysulphide in the presence of a copper compound, the said dyestuffs being dark powders nearly insoluble in water but dissolving readily in dilute sodium sulphide solution and dyeing cotton in brown shades.

11. As a new product, the sulphide dyestuff obtainable by treating under pressure a nuclear hydroxylated phenazine with alkali metal hydroxide and carbon dioxide and thionating the resulting product with an alkali metal polysulphide in the presence of a copper compound, the said dyestuff being a dark powder nearly insoluble in water but dissolving readily in dilute sodium sulphide solution and dyeing cotton in brown shades.

12. As a new product, the sulphide dyestuff obtainable by treating under pressure a nuclear hydroxylated phenazine with alkali metal hydroxide and carbon dioxide and thionating the resulting product with an alkali metal polysulphide in the presence of a copper compound, the said dyestuff being a dark green powder nearly insoluble in water but dissolving readily in dilute sodium sulphide solution and dyeing cotton in brown shades.

In testimony whereof we affix our signatures.

RUPERT W. POPE.
MAX WYLER.